US012373823B2

(12) United States Patent
Saad et al.

(10) Patent No.: US 12,373,823 B2
(45) Date of Patent: Jul. 29, 2025

(54) FACILITATING CRYPTOCURRENCY-BASED TRANSACTIONS WITH TIME CONSTRAINT

(71) Applicant: PAYPAL, INC., San Jose, CA (US)

(72) Inventors: Muhammad Saad, Scottsdale, AZ (US); Jakub Burgis, Scottsdale, AZ (US); Raoul Johnson, Scottsdale, AZ (US)

(73) Assignee: PAYPAL, INC., San Jose, CA (US)

( * ) Notice: Subject to any disclaimer, the term of this patent is extended or adjusted under 35 U.S.C. 154(b) by 229 days.

(21) Appl. No.: 17/832,396

(22) Filed: Jun. 3, 2022

(65) Prior Publication Data

US 2023/0394471 A1    Dec. 7, 2023

(51) Int. Cl.
  *G06Q 20/36*    (2012.01)
(52) U.S. Cl.
  CPC ..... *G06Q 20/3678* (2013.01); *G06Q 2220/00* (2013.01)
(58) Field of Classification Search
  CPC ................ G06Q 20/3678; G06Q 2220/00
  See application file for complete search history.

(56) References Cited

U.S. PATENT DOCUMENTS

| | | | |
|---|---|---|---|
| 2003/0101345 A1 | 5/2003 | Nyberg | |
| 2015/0363876 A1 | 12/2015 | Ronca et al. | |
| 2016/0203477 A1 | 7/2016 | Yang et al. | |
| 2016/0335628 A1 | 11/2016 | Weigold | |
| 2017/0053249 A1 | 2/2017 | Tunnell et al. | |
| 2019/0312734 A1* | 10/2019 | Wentz | .................. H04L 9/3239 |
| 2022/0046027 A1* | 2/2022 | Klarman | ............... H04L 9/3239 |
| 2023/0169826 A1* | 6/2023 | Higgins | .............. G07F 17/3244 463/25 |

OTHER PUBLICATIONS

International Search Report and Written Opinion for Application No. PCT/US2023/022133 mailed on Aug. 15, 2023, 13 pages.
https://en.wikipedia.org/wiki/Schnorr_signature; "Schnorr signature"; Jun. 9, 2022; Wikipedia; 4 pages.
https://asecuritysite.com/zero/go_fiat2; Fiat-Shamir with Go and ECC (Non-interactive ZKP); Jun. 29, 2022; Wikipedia; 5 pages.

* cited by examiner

*Primary Examiner* — John W Hayes
*Assistant Examiner* — Zehra Raza
(74) *Attorney, Agent, or Firm* — Haynes and Boone, LLP (57) ABSTRACT

Methods and systems are presented for providing a framework for facilitating time-sensitive cryptocurrency transactions for users. When a request for processing a time-sensitive cryptocurrency transaction using funds from a cryptocurrency wallet is received from a user, a transaction system first verifies whether the cryptocurrency wallet has a balance to cover the cryptocurrency transaction. The transaction system also verifies the ownership of the cryptocurrency wallet based on an asynchronous method. The user generates verification data without any input from the transaction system, and based on a private key associated with the cryptocurrency wallet, a generator function, and a user-generated value. Without knowing the user-generated value, the transaction system verifies the ownership of the cryptocurrency wallet based on the verification data, and processes the transaction for the user.

20 Claims, 4 Drawing Sheets

FACILITATING CRYPTOCURRENCY-BASED TRANSACTIONS WITH TIME CONSTRAINT

BACKGROUND

The present specification generally relates to electronic cryptocurrency transactions, and more specifically, to providing a computer framework for facilitating time-sensitive cryptocurrency transactions according to various embodiments of the disclosure.

RELATED ART

As an increasing number of merchants are accepting cryptocurrency as a payment instrument, cryptocurrency is becoming more popular among the public. For example, many people can now use cryptocurrency to purchase goods and services from numerous merchants. However, due to the technical requirements of processing transactions using cryptocurrency, there remains several disadvantages when transacting using cryptocurrency. For example, the decentralized and distributed nature of managing cryptocurrency requires that each transaction be verified (e.g., by performing a proof-of-work or a proof-of-stake process, etc.) and recorded on a distributed ledger (e.g., a distributed blockchain) by a set of computer nodes. This process ensures that the amount of cryptocurrency being spent in association with the transaction is in possession of a sender of the transaction at the time of the transaction, and that the amount has not been spent by the sender prior to the transaction, thereby maintaining the integrity of the cryptocurrency system. Such a verification and recording process, depending on the implementations of the different cryptocurrency systems, can take a long time. For example, for certain cryptocurrencies (e.g., Bitcoin), it can take up to several minutes, several hours, or even several days in some instances to complete a transaction.

When a purchase transaction is associated with a time constraint (e.g., an offer that is expiring in 10 minutes, making a bid in an auction, etc.), the time requirements for completing a cryptocurrency transaction may hinder a user from performing the purchase transaction in a timely manner. Thus, there is a need for providing a framework for securely and efficiently processing cryptocurrency transactions that are time sensitive.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure includes methods and systems for providing a framework for facilitating time-sensitive cryptocurrency transactions for users. As discussed herein, due to the distributed and decentralized nature of blockchains, certain verification processes (e.g., a proof-of-work process, a proof-of-stake process, etc.) are in place to ensure that the amount of cryptocurrency being spent in association with the transaction is in possession of a sender of the transaction at the time of the transaction, and that the amount has not been spent by the sender prior to the transaction, thereby maintaining the integrity of the cryptocurrency system. Such a verification process, depending on the implementations by the cryptocurrency system, may take a long time to complete (e.g., several hours, several days, etc.). The processing requirement may prevent certain users from performing certain time-sensitive transactions using cryptocurrency. These time-sensitive transactions usually do not present a challenge for users who conduct the transactions using fiat currency, as systems are in place to process transactions in fiat currency efficiently, in real time (e.g., in a matter of seconds).

Consider an example in which a purchase of an item (as used herein, items can include products, services, access, and content) is associated with a time constraint (e.g., an incentive for purchasing the item expiring in 10 minutes, making a bid in an auction, etc.). Such a purchase can typically be made without any challenges in fiat currencies, as transaction processing systems can process a purchase transaction in a fiat currency within a short period of time (e.g., less than a second, a few seconds, etc.). However, with the increased prevalent use of cryptocurrency, a user may wish to use funds in a cryptocurrency (e.g., Bitcoins, Ether, etc.) to fund at least a portion of the purchase. Unfortunately, the user may not be able to perform the purchase transaction in this scenario when the time requirement for processing a cryptocurrency transaction in the cryptocurrency exceeds the time constraint (e.g., takes longer than 10 minutes to process the cryptocurrency transaction).

As such, according to various embodiments of the disclosure, a payment service provider system may assist users in performing cryptocurrency transactions when the transactions are associated with a time constraint. In some embodiments, the payment service provider system may use one or more intermediary transactions in order to assist a user to perform the purchase transaction within the associated time constraint. For example, the payment service provider system may first initiate a conversion transaction to convert funds from a cryptocurrency account of the user (e.g., a cryptocurrency wallet) in the cryptocurrency (also referred to as a "source currency") to another currency (also referred to as the "target currency," e.g., a fiat currency such as U.S. Dollars, another cryptocurrency, etc.) that is acceptable for performing the purchase transaction and could process a transaction within the time constraint. The conversion transaction may involve a two-step transaction—(1) a first fund transfer transaction for transferring the funds in the cryptocurrency (the source currency) from the user's cryptocurrency wallet to a cryptocurrency wallet associated with the payment service provider system and (2) a second fund transfer transaction for transferring equivalent funds in the target currency (based on a current conversion rate) from an account associated with the payment service provider system to a funding account associated with the user. The payment service provider system (or the user) may then use the converted funds in the funding account associated with the user to perform the purchase transaction.

However, such a conversion also takes a substantial amount of time to complete, as it involves two fund transfer transactions and at least one of which involves a cryptocurrency transaction. As such, in some embodiments, once the payment service provider system initiates the first fund transfer transaction to transfer the funds in the cryptocurrency from the user's cryptocurrency wallet to the cryptocurrency wallet associated with the payment service provider system and without waiting for the first fund transfer transaction to complete, the payment service provider system may initiate the second fund transfer transaction to transfer the equivalent funds in the target currency to the account associated with the user. This way, the equivalent funds may be transferred to the account of the user in time for processing the purchase transaction using the account of the user within the time constraint. In some embodiments, the payment service provider system may eliminate the second fund transfer transaction, and may perform the purchase transaction using the account associated with the payment service provider system, while waiting for the first fund transfer transaction to complete. In either approach, the payment service provider system is required to extend a credit to the user (e.g., lending the user the funds) for the purchase transaction while waiting for the first fund transfer transaction to complete.

There is a risk associated with providing the user the credit in this scenario, however, as the payment service provider system is not guaranteed to receive the funds from the first fund transfer transaction. For example, the user may lie about being the legitimate owner of the cryptocurrency wallet in order to receive credits from the payment service provider system for performing the purchase transaction. This risk may be greatly reduced if the payment service provider system can verify the ownership and the balance of the cryptocurrency wallet before performing the purchase transaction on behalf of the user.

Due to the decentralized and distributed nature of cryptocurrency ledger systems, the balance of any cryptocurrency wallet can be verified by accessing and traversing the distributed ledger (e.g., a blockchain) associated with the cryptocurrency. If the cryptocurrency wallet of the user is with an exchange associated with the payment service provider system (e.g., where the payment service provider system has control over and/or access to the cryptocurrency wallet of the user), the payment service provider system can verify that the user is the legitimate owner of the cryptocurrency wallet by accessing the information associated with the cryptocurrency wallet (e.g., in a database of the payment service provider system). However, it would be a challenge to verify the ownership of the cryptocurrency wallet when the user wishes to use funds from a private wallet or a wallet with a third-party exchange.

As such, according to various embodiments of the disclosure, the payment service provider system may adopt a mechanism to verify ownerships of cryptocurrency wallets. As disclosed herein, by verifying the ownership and the balance of the cryptocurrency wallet, the risk associated with the payment service provider system facilitating the purchase transaction for the user can be greatly reduced. Thus, after verifying the ownership and the balance of the cryptocurrency wallet (e.g., verifying that the user has control over the cryptocurrency wallet and that the cryptocurrency wallet has sufficient funds for the transaction), the payment service provider system may proceed with performing the purchase transaction on behalf of the user based on a credit provided to the user with a substantially reduced risk. The user may then transfer the funds in the source currency (e.g., the cryptocurrency) to a wallet associated with the payment service provider system to pay off the credit.

The mechanism to verify the ownership of a cryptocurrency wallet can be implemented in one of two ways—a synchronous method and an asynchronous method. Each cryptocurrency wallet is typically associated with a pair of encryption keys (e.g., a private key and a public key), generated using a key generation algorithm associated with the corresponding cryptocurrency. For example, a private key may first be generated (e.g., randomly or using a particular algorithm, etc.). The private key may then be provided to the key generation algorithm to produce a corresponding public key. A characteristic of the private key and the public key is that data that is encrypted using the private key can only be decrypted using the corresponding public key, and vice versa.

The private key is kept as a secret by the owner of the cryptocurrency wallet and can be used by the owner of the cryptocurrency wallet to encrypt transaction request/transaction data to be recorded on the distributed ledger (e.g., a blockchain). The cryptocurrency network (a group of computer nodes configured to maintain the distributed ledger and record transactions on the distributed ledger) or anyone who has access to the distributed ledger may verify the transaction request/transaction data generated by the owner of the cryptocurrency wallet by decrypting the data using the public key associated with the cryptocurrency wallet. While anyone who has access to the distributed ledger can obtain data (e.g., account balance, transaction records, etc.) associated with any cryptocurrency wallet, only the legitimate owner of the cryptocurrency wallet possesses the private key associated with the cryptocurrency wallet. As such, one way to verify the ownership of the cryptocurrency wallet is to determine whether the user has possession of the private key associated with the cryptocurrency wallet.

For example, the user may generate a digital signature by encrypting a piece of data using the private key associated with the cryptocurrency wallet, and may transmit the digital signature along with the piece of data (e.g., a string, a word, a phrase, a series of numerals, etc.) to the payment service provider system. The payment service provider system may decrypt the digital signature using the public key associated with the cryptocurrency wallet, and may verify that the user is the owner of the cryptocurrency wallet if the decrypted data matches the piece of data. However, since different digital signatures are often generated for different cryptocurrency accounts for various purposes (e.g., each transaction recorded in the distributed ledger may include a digital signature of a cryptocurrency wallet), the user could obtain a digital signature (that is generated for an account not in control by the user) from the distributed ledger and send that digital signature to the payment service provider system in order to purport that the user is the owner of that account.

Thus, in order to ensure that the user generates the digital signature used for verification of ownership (e.g., and not re-using digital signatures generated by others), using the synchronous method, the payment service provider system may first determine a piece of data (e.g., seed data, which can be randomly generated, or generated based on information associated with the purchase transaction, etc.) to be encrypted. The payment service provider system may request the user to generate a digital signature based on the seed data. A user device of the user may generate the digital signature by encrypting the seed data using the private key associated with the cryptocurrency wallet, and transmit the digital signature to the payment service provider system. The payment service provider system may decrypt the digital signature using the public key associated with the cryptocurrency wallet, and may determine that the user is the legitimate owner of the cryptocurrency wallet if the decrypted data matches the seed data. One disadvantage of such a synchronous verification mechanism is the requirement of a two-way communication between the user device of the user and the payment service provider system. For example, using this synchronous method, the user has to first transmit a request for performing a time-sensitive purchase transaction using funds in a cryptocurrency to the payment service provider system. The payment service provider system may then generate and send the seed data to the user device. The user device may generate the digital signature based on the seed data, and transmit the digital signature to the payment service provider system for verification. With the requirement of two-way communication between the payment service provider system and the user device, such a protocol based on the synchronous method can lead to an increased latency for processing the purchase transaction.

In some embodiments, the payment service provider system may use an asynchronous method to verify the ownership of the cryptocurrency wallet. The asynchronous method does not require the payment service provider system to generate seed data and transmit the seed data to the user device of the user. Instead, the user device may generate verification data (e.g., a triplet) using one or more mathematical calculations based on the private key associated with the cryptocurrency wallet, a generator function that was used to generate the private key and/or the public key, and a user-generated value (e.g., a random value), without requiring any input from the payment service provider system. The mathematical calculations for generating the verification data are designed in such a way that anyone obtaining the verification data (e.g., the triplet) can verify, using the public key associated with the cryptocurrency wallet, that the entity that generated the verification data has possession of the private key associated with the cryptocurrency wallet, without knowing what data was used to generate the verification data.

The user device may then transmit the triplet to the payment service provider system. In some embodiments, the user device may transmit the triplet along with the request for processing the purchase transaction to the payment service provider system to further reduce the latency for processing the transaction. Upon receiving the triplet, the payment service provider system may calculate an output based on the public key associated with the cryptocurrency wallet, the generator function that was used to generate the private key and/or the public key, and two of the values in the triplet. The calculations involved for generating the triplet and the output data are designed such that the output data would match the remaining value in the triplet if the private key used to generate the triplet corresponds to the public key used to generate the output data. In some embodiments, the calculations are based on the Schnorr signature. Thus, the payment service provider system may verify that the user is the owner of the cryptocurrency wallet if the output data (generated based on the public key associated with the cryptocurrency wallet) matches the value in the triplet. The asynchronous method is advantageous over the synchronous method as it requires only a single communication from the user device of the user to the payment service provider system to verify the ownership of the user account, whereas the synchronous method requires three separate communications, as illustrated above.

In some embodiments, in order to prevent the user from re-using a triplet that has been generated (e.g., by the user or another user for a past transaction) in this transaction, the payment service provider system may require that the value that is used to generate the triplet be different every time (such that the triplet has different values from any previously generated triplets). For example, the payment service provider system may require the user device to determine the value based on a current date/time or a counter that automatically increments every time a triplet is generated by the user device. The payment service provider system may store all of the triplets provided to the payment service provider system from different users in association with past purchase transactions. Upon receiving the triplet from the user, the payment service provider system may compare the triplet against triplet(s) received by the payment service provider system and corresponding to the cryptocurrency wallet. If the triplet matches (e.g., has identical values) any of the triplet(s) stored by the payment service provider system, the payment service provider system may deny the request for processing the purchase transaction, as the user may have re-used the triplet.

In some embodiments, the payment service provider system may select one of the synchronous method or the asynchronous method for verifying the ownership of the digital wallet based on a set of factors, such as the time constraint associated with the transaction, the computer network bandwidth, etc. For example, the payment service provider system may select to use the asynchronous method for verifying the ownership of the digital wallet when the time constraint is less than a threshold (e.g., less than 5 minutes, etc.). In some embodiments, the payment service provider system may also detect a computer network bandwidth between the payment service provider system and the user device, and may select to use the asynchronous method for verifying the ownership of the digital wallet when the network bandwidth is below a threshold.

After verifying the ownership and the balance of the cryptocurrency wallet, the payment service provider system may proceed with processing the purchase transaction for the user, using funds from an account associated with the payment service provider system. The payment service provider system may also request the user to initiate the first fund transfer transaction—to transfer the funds in the cryptocurrency from the cryptocurrency wallet to a wallet associated with the payment service provider system. In some embodiments, the payment service provider system may process the purchase transaction only after receiving a confirmation from the cryptocurrency system that the first fund transfer transaction has been initiated. By using the mechanisms (e.g., the synchronous method, the asynchronous method, etc.) to verify the ownership of the cryptocurrency wallet as disclosed herein, the payment service provider system may facilitate purchase transactions for the user based on extending a credit to the user to complete the transactions in a timely manner (e.g., within the time constraint associated with the purchase transactions).

Figure 1:
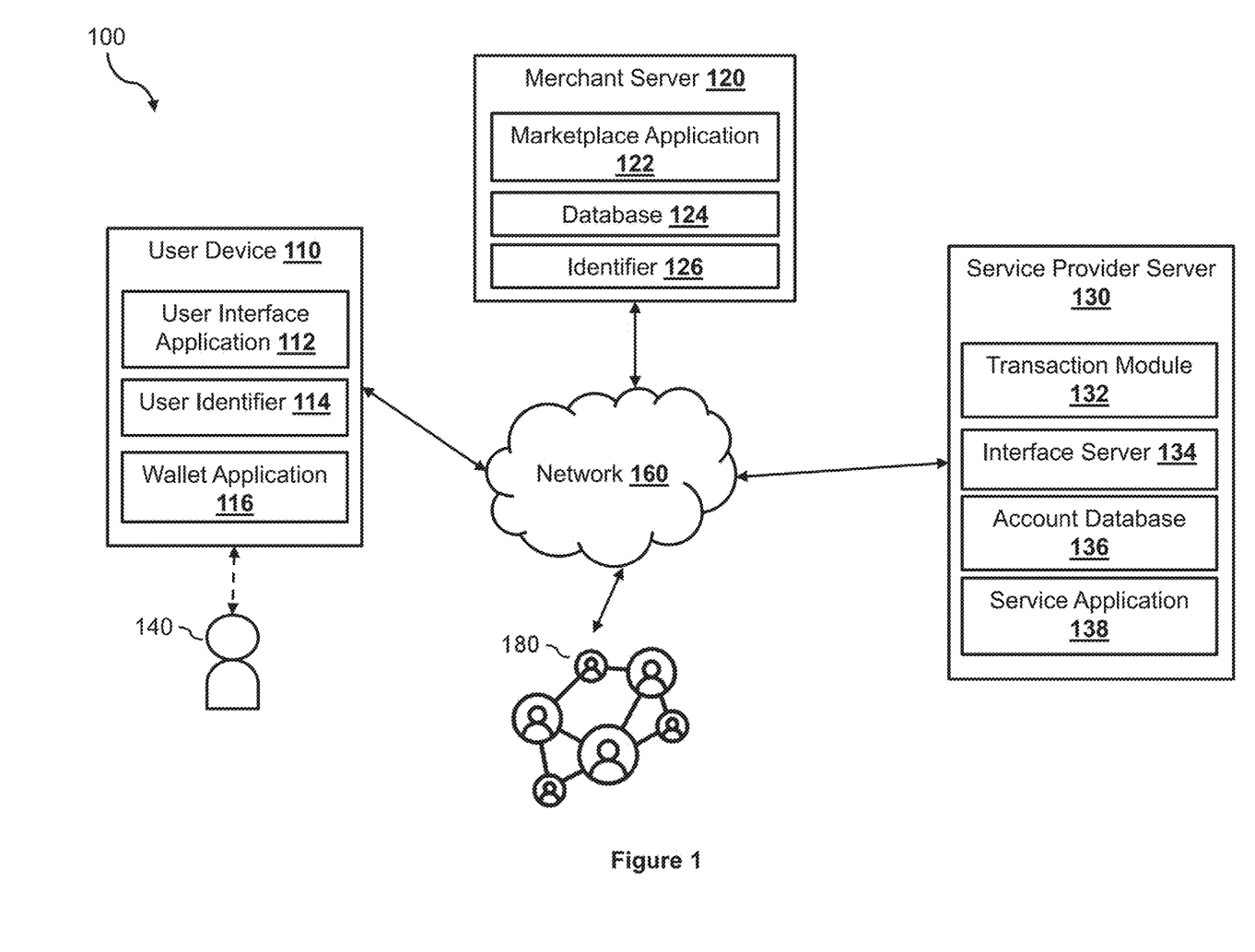
FIG. 1 is a block diagram illustrating a networked system that includes an electronic transaction system according to an embodiment of the present disclosure.

FIG. 1 illustrates a networked system 100, within which the payment service provider system may be implemented according to one embodiment of the disclosure. Note that the present techniques may be applied in many different computing and technological environments, however, and are not limited to those shown in the figures. The networked system 100 includes a service provider server 130, a merchant server 120, a user device 110, and a cryptocurrency network 180 that may be communicatively coupled with each other via a network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The cryptocurrency network 180 may include multiple computer nodes for managing transactions associated with a cryptocurrency using a decentralized and distributed ledger (e.g., a blockchain). The decentralized and distributed ledger may store transaction data related to cryptocurrency transactions of the cryptocurrency. Each computer node within the cryptocurrency network 180 manages a copy of the distributed ledger. When the computer nodes receive transaction data associated with a cryptocurrency transaction from a device (e.g., the user device 110, etc.), the computer nodes compete against each other in solving a mathematical problem (which is part of a verification process such as a proof-of-work process or a proof-of-stake process). Once a computer node solves the mathematical problem, the computer node may record the transaction (e.g., in a block) on its copy of the distributed ledger, and broadcast the block and the solution to the mathematical problem to the other computer nodes, such that the other computer nodes can update their copies of the distributed ledger. The computer node that won (e.g., the fastest to solve the mathematical problem) would be granted the right to receive a compensation (e.g., in the form of a mined coin and/or a service fee charged to a party to the transaction).

The user device 110, in one embodiment, may be utilized by a user 140 to interact with the merchant server 120, the cryptocurrency network 180, and/or the service provider server 130 over the network 160. For example, the user 140 may use the user device 110 to conduct an online transaction with the merchant server 120 via websites hosted by, or mobile applications associated with, the merchant server 120. The user 140 may also conduct cryptocurrency transactions by directly interacting with the cryptocurrency network 180 (e.g., by communicating transaction data to one or more computer nodes within the cryptocurrency network 180), or via the service provider server 130. The user 140 may also log in to a user account to access account services or conduct electronic transactions (e.g., account transfers or payments, purchasing goods and/or services, etc.) with the service provider server 130. The user device 110, in various embodiments, may be implemented using any appropriate combination of hardware and/or software configured for wired and/or wireless communication over the network 160. In various implementations, the user device 110 may include at least one of a wireless cellular phone, wearable computing device, PC, laptop, etc.

The user device 110, in one embodiment, includes a user interface (UI) application 112 (e.g., a web browser, a mobile payment application, etc.), which may be utilized by the user 140 to interact with the merchant server 120, the cryptocurrency network 180, and/or the service provider server 130 over the network 160. In one implementation, the user interface application 112 includes a software program (e.g., a mobile application) that provides a graphical user interface (GUI) for the user 140 to interface and communicate with the service provider server 130, the cryptocurrency network 180, and/or the merchant server 120 via the network 160. In another implementation, the user interface application 112 includes a browser module that provides a network interface to browse information available over the network 160. For example, the user interface application 112 may be implemented, in part, as a web browser to view information available over the network 160.

The user device 110 may include a wallet application 116 configured to facilitate payments for the user 140. In some embodiments, the wallet application 116 may be associated with a digital wallet of the user 140 such that funds in a cryptocurrency can be transferred from the digital wallet of the user 140 to another digital wallet of another user (e.g., a wallet associated with another user, a wallet associated with the merchant server 120, a wallet associated with the service provider server 130, etc.) using the wallet application 116. In some embodiments, the wallet application 116 may be configured to perform cryptocurrency transactions through communication with the cryptocurrency network 180 and/or the service provider server 130. The user 140, through the user interface provided by the wallet application 116 on the user device 110, may initiate a cryptocurrency transaction (e.g., transferring a particular amount in a cryptocurrency from the digital wallet of the user 140 to another digital wallet). For example, the user 140 may specify an identity of the recipient digital wallet and an amount in the cryptocurrency via the user interface of the wallet application 116. The wallet application 116 may transmit the transaction data associated with the cryptocurrency transaction to the cryptocurrency network 180.

The user device 110, in one embodiment, may include at least one identifier 114, which may be implemented, for example, as operating system registry entries, cookies associated with the user interface application 112 and/or the wallet application 116, identifiers associated with hardware of the user device 110 (e.g., a media control access (MAC) address), or various other appropriate identifiers. In various implementations, the identifier 114 may be passed with a user login request to the service provider server 130 via the network 160, and the identifier 114 may be used by the service provider server 130 to associate the user 140 with a particular user account, a particular digital wallet, and/or a particular profile.

In various implementations, the user 140 is able to input data and information into an input component (e.g., a keyboard) of the user device 110. For example, the user 140 may use the input component to interact with the UI application 112 (e.g., to retrieve content from third-party servers such as the merchant server 120, to transmit cryptocurrency transaction data to the cryptocurrency computer network 180, to provide inputs related to a goal to the service provider server 130, etc.).

While only one user device 110 is illustrated in the networked system 100, it has been contemplated that multiple user devices (each similar to the user device 110), may be connected to the network 160 to perform transactions with other devices (e.g., the user device 110, the merchant server 120, the cryptocurrency network 180, and/or the service provider server 130, etc.). Each of the other user devices may include similar hardware and software components as the user device 110 to enable their respective users to interact with the merchant server 120, the cryptocurrency network 180, and the service provider server 130 through the user devices.

The merchant server 120, in various embodiments, may be maintained by a business entity (or in some cases, by a partner of a business entity that processes transactions on behalf of business entity). Examples of business entities include merchants, resource information providers, utility providers, real estate management providers, social networking platforms, etc., which offer various items for viewing, accessing, and/or purchasing, and process payments for the purchases. As shown, the merchant server 120 may include a merchant database 124 for identifying available items, which may be made available to the user device 110 for viewing and purchase by the user.

The merchant server 120, in one embodiment, may include a marketplace application or server 122, which may be configured to provide information (e.g., displayable content) over the network 160 to the user interface application 112 of the user device 110. In one embodiment, the marketplace application 122 may include a web server that hosts a merchant website for the merchant. For example, the user 140 of the user device 110 may interact with the marketplace application 122 through the user interface application 112 over the network 160 to search and view various items available for access and/or purchase in the merchant database 124. The merchant server 120, in one embodiment, may be associated with at least one merchant identifier 126, which may be included as part of the one or more items made available for purchase so that, e.g., particular items are associated with the particular merchants. In one implementation, the merchant identifier 126 may include one or more attributes and/or parameters related to the merchant, such as business and banking information. The merchant identifier 126 may include attributes related to the merchant server 120, such as identification information (e.g., a serial number, a location address, GPS coordinates, a network identification number, etc.). In some embodiments, the merchant server 120 may be associated with a digital wallet for receiving funds, including cryptocurrency, from other digital wallets for purchasing items from the business entity.

While only one merchant server 120 is shown in FIG. 1, it has been contemplated that multiple merchant servers, each associated with a different merchant, may be connected to the user device 110 and the service provider server 130 via the network 160.

The service provider server 130, in one embodiment, may be maintained by a transaction processing entity or an online payment service provider, which may provide processing for electronic transactions between different entities (e.g., among the users, between a user and one or more business entities (e.g., the business entity associated with the merchant server 120, etc.), or other types of payees. As such, the service provider server 130 may include a service application 138, which may be adapted to interact with the user device 110, the cryptocurrency network 180, and/or the merchant server 120 over the network 160 to facilitate the searching, selection, purchase, fund transfers, payment of items, and/or other services offered by the service provider server 130. In some embodiments, the service provider server 130 is one of the computer nodes within the cryptocurrency network 180, configured to maintain the distributed ledger of a cryptocurrency. In one example, the service provider server 130 may be provided by PayPal®, Inc., of San Jose, California, USA, and/or one or more service entities or a respective intermediary that may provide multiple point of sale devices at various locations to facilitate transaction routings between merchants and, for example, service entities.

In some embodiments, the service application 138 may include a payment processing application (not shown) for processing purchases and/or payments for electronic transactions (e.g., in fiat currency and/or cryptocurrency, etc.) between a user and a merchant or between any two entities (e.g., between two users, etc.). In one implementation, the payment processing application assists with resolving electronic transactions through validation, delivery, and settlement. As such, the payment processing application settles indebtedness between a user and a merchant, wherein accounts may be directly and/or automatically debited and/or credited of monetary funds.

The service provider server 130 may also include an interface server 134 that is configured to serve content (e.g., web content) to users and interact with users. For example, the interface server 134 may include a web server configured to serve web content in response to HTTP requests. In another example, the interface server 134 may include an application server configured to interact with a corresponding application (e.g., a service provider mobile application) installed on the user device 110 via one or more protocols (e.g., RESTAPI, SOAP, etc.). As such, the interface server 134 may include pre-generated electronic content ready to be served to users. For example, the interface server 134 may store a log-in page and is configured to serve the log-in page to users for logging into user accounts of the users to access various services provided by the service provider server 130 (e.g., such as the auxiliary cryptocurrency transaction services as disclosed herein). The interface server 134 may also include other electronic pages associated with the different services (e.g., purchase payment services, electronic transaction services, etc.) offered by the service provider server 130. As a result, a user (e.g., the user 140, or a merchant associated with the merchant server 120, etc.) may access a user account associated with the user and access various services offered by the service provider server 130, by generating HTTP requests directed at the service provider server 130.

The service provider server 130, in one embodiment, may be configured to maintain one or more user accounts and merchant accounts in an account database 136, each of which may be associated with a profile and may include account information associated with one or more individual users (e.g., the user 140 associated with user device 110, etc.) and merchants. The account information may include an identifier of a digital wallet associated with each user account of a user. In one implementation, a user may have credentials to authenticate or verify identity with the service provider server 130. Thus, the service provider server may store the credentials of the users in corresponding records of the account database 136 associated with the user accounts.

In various embodiments, the service provider server 130 includes a transaction module 132 that implements the payment service provider system as discussed herein. In particular, the transaction module 132 may be configured to facilitate transactions (e.g., purchase transaction, fund transfer transactions, etc.) that involve a cryptocurrency for a user when the transactions are associated with a time constraint. As discussed herein, certain verification processes (e.g., a proof-of-work process, a proof-of-stake process, etc.) associated with a cryptocurrency transaction may take a long time to complete (e.g., several hours, several days, etc.). The verification requirements, while necessary due to the decentralized and distributed nature of cryptocurrency, may prevent users (e.g., the user 140) from performing certain time sensitive transactions, such as an offer that is expiring in a short period of time, a bid in an auction, etc.

In some embodiments, the transaction module 132 may assist the user 140 in facilitating the transaction (e.g., performing the purchase transaction, making the bid in the auction, etc.) using funds in a cryptocurrency (also referred to as a "source currency") within the time constraint. In some embodiments, the transaction module 132 may use one or more intermediary transactions in order to assist the user 140 in performing the transaction within the associated time constraint.

Figure 2:
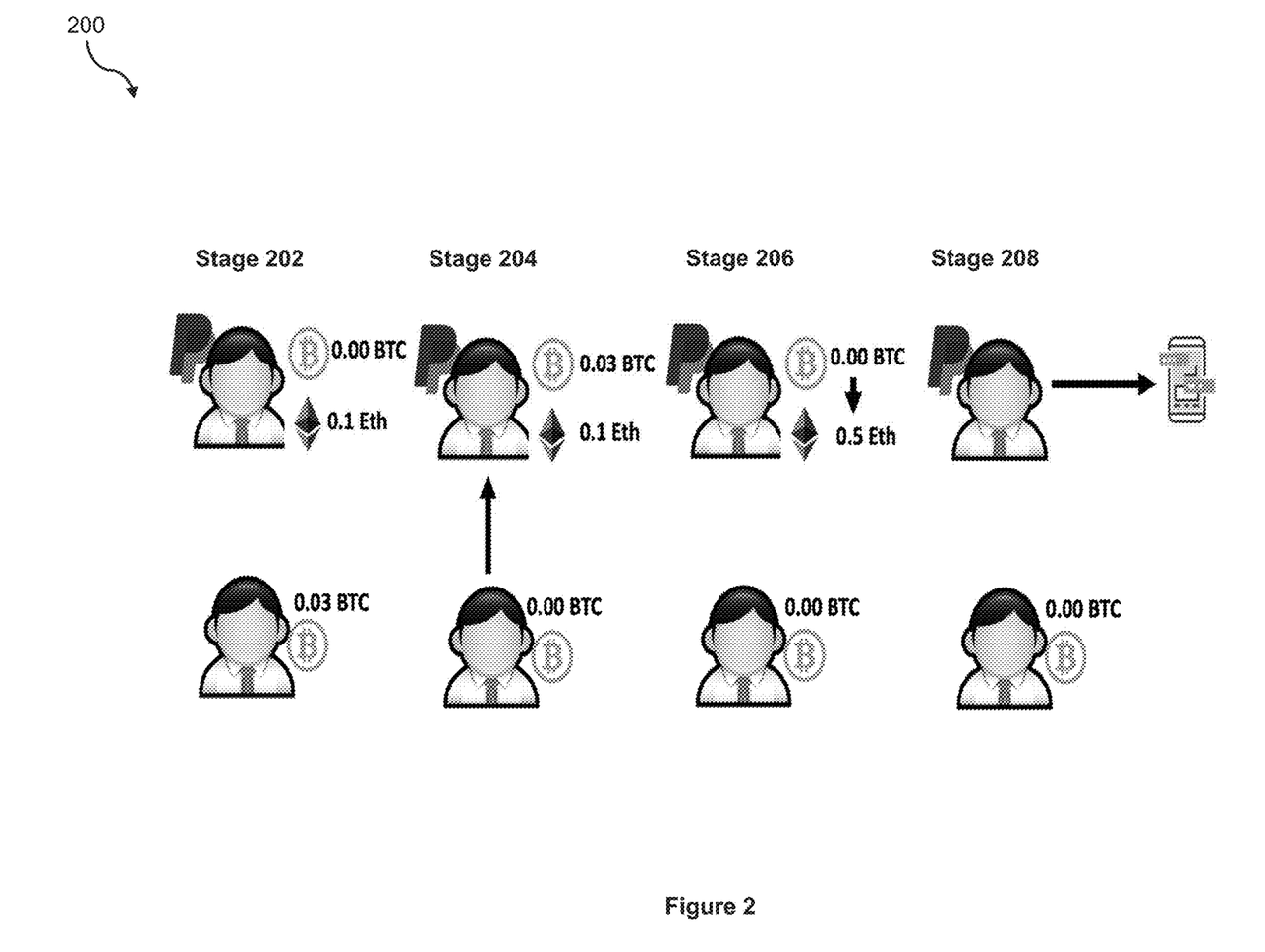
FIG. 2 illustrates an example process flow for assisting a user in processing a time-sensitive transaction using a cryptocurrency according to an embodiment of the present disclosure.

FIG. 2 illustrates a transaction flow 200 for assisting a user in performing a transaction having an associate time constraint. In this example shown in FIG. 2, a user (e.g., the user 140) may be offered an incentive (e.g., by a merchant associated with the merchant server 120) to purchase an item (e.g., a discount, a reward, etc.), but the incentive may be expiring in a short amount of time (e.g., 10 minutes, etc.). The offer requires the user 140 to purchase the item using a particular currency (also referred to as a "target currency"), which can be a fiat currency (e.g., U.S. Dollars) or a cryptocurrency (e.g., Ether, etc.). In this example, the offer requires the user to pay 0.5 Ether for purchasing the item. However, the user 140 may not have sufficient funds in the target currency. In this example, the user 140 may only have 0.1 Ether. Instead, the user 140 may wish to perform the purchase transaction using funds in another cryptocurrency (e.g., Bitcoin, etc.) different from the target currency stored in a digital wallet. As shown in stage 202 in the transaction flow 200, the user 140 currently has 0.1 Ether in one digital wallet and Bitcoins in another digital wallet (e.g., a wallet that is privately managed by the user 140, a wallet with an exchange not associated with the service provider server 130, etc.).

In order to assist the user 140 to perform the purchase transaction using the source cryptocurrency (e.g., Bitcoin), the transaction module 132 may first transfer the 0.03 Bitcoin from the digital wallet of the user 140 to a wallet that is associated with the service provider server 130, as shown in stage 204. In stage 206, the transaction module 132 may convert the 0.03 Bitcoin to 0.4 Ether (e.g., based on a current conversion rate), such that the user 140 now has 0.5 Ether in the wallet associated with the service provider server 130. In stage 208, the transaction module 132 may process a purchase transaction with the merchant server 120 using the 0.5 Ether in the wallet of the user 140 to purchase the item.

However, such a transaction flow 200 requires multiple cryptocurrency transactions, which may take longer than the required time constraint to complete. For example, a Bitcoin transaction (e.g., as occurred in stage 204 where 0.03 Bitcoins are transferred from the digital wallet to a wallet associated with the service provider server 130) may take up to 50 minutes to complete, due to the verification processes. As such, by the time that the user 140 has 0.5 Ether in the account to perform the purchase transaction, the offer would have already expired.

As such, the transaction module 132 may proceed with funding the wallet of the user 140 with 0.4 Ether and processing the purchase transaction for the user 140 before the transfer of the 0.03 Bitcoins from the digital wallet of the user 140 to the wallet associated with the service provider server 130 is complete. In order to minimize a risk associated with funding the purchase transaction for the user 140 without waiting for the transfer of the fund to be completed, the transaction module 132 may verify the ownership and a balance of the digital wallet of the user 140 using one or more verification mechanisms as disclosed herein.

Figure 3:
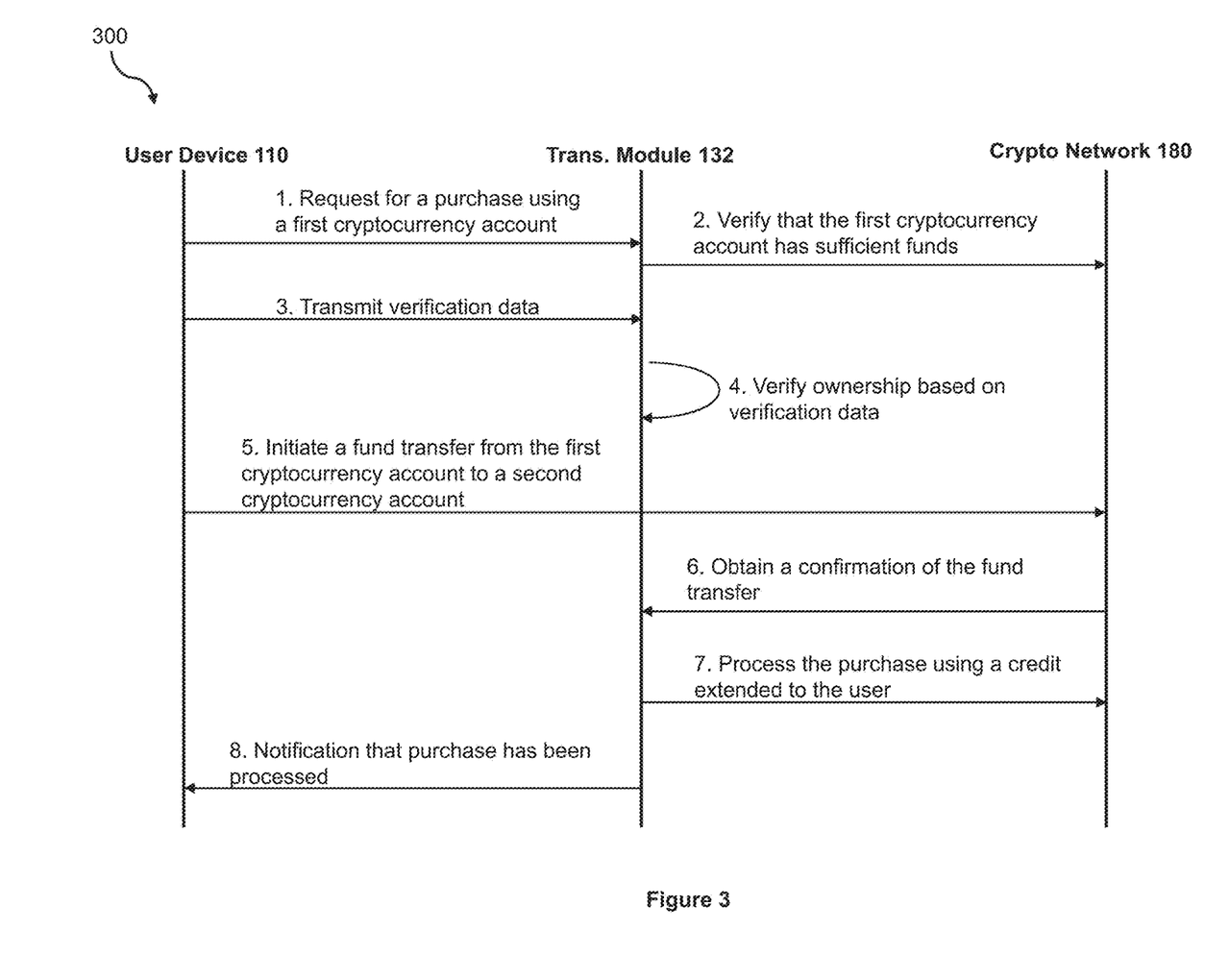
FIG. 3 illustrates an example process flow for processing a time-sensitive transaction based on verifying an ownership of a digital wallet according to an embodiment of the present disclosure.

FIG. 3 illustrates a transaction/communication flow 300 among the user device 110, the transaction module 132, and the cryptocurrency network 180 for facilitating a time-sensitive transaction for a user using the techniques disclosed herein according to various embodiments of the disclosure. Using the example described above, the user 140 may receive an offer to purchase an item. The user 140 may desire to use funds in a source currency (e.g., Bitcoin, or other types of cryptocurrency, etc.) to make the purchase. However, the offer may be associated with a time constraint (e.g., 10 minutes, etc.). Since a transaction that involves the source currency (e.g., Bitcoin) may take a longer time than the required time constraint to complete, due to the verification process involved in performing a cryptocurrency transaction in the cryptocurrency, the user 140 may, via the user device 110, transmit a request (in step one of the flow 300) to the transaction module 132. The request may include transaction data associated with the purchase transaction, such as information about the merchant that offers the item for sale, a description of the item, a price of the item in a currency acceptable by the merchant, the time constraint associated with the purchase transaction, etc. In some embodiments, the request may also indicate the desire to use funds from a particular wallet (e.g., an identifier of a digital wallet) in the source currency (e.g., Bitcoin) for the purchase transaction.

In step two of the flow 300, the transaction module 132 may verify that the digital wallet of the user 140 has sufficient funds for the purchase transaction. For example, the transaction module 132 may access a distributed ledger (e.g., a blockchain) associated with the source currency via the cryptocurrency network 180, and determine a balance of the digital wallet based on the identifier of the digital wallet of the user 140. The data (e.g., transaction data) associated with the digital wallet may be encrypted using a private key associated with the digital wallet. As such, in some embodiments, the transaction module 132 may retrieve a public key associated with the digital wallet from the cryptocurrency network 180, and may use the public key to decrypt the transaction data associated with the digital wallet and stored on the distributed ledger of the source currency in order to determine a balance of the digital wallet.

After verifying the balance of the digital wallet, the transaction module 132 may verify the ownership of the digital wallet in order to ensure that the user 140 has control over the digital wallet. Steps three and four of the flow 300 include transmission of verification data from the user device 110 to the transaction module 132 and verifying, by the transaction module 132, the ownership of the digital wallet based on the verification data. As discussed herein, the transaction module 132 may verify the ownership of the digital wallet according to any one of two methods—a synchronous method or an asynchronous method. Using the synchronous method, the transaction module 132 may first transmit a piece of data (e.g., seed data) to the user device 110, and may request the user device 110 to generate a digital signature using the seed data. The seed data can be generated by the transaction module 132 in different ways, such as using a random data generator, or by using data associated with the transaction. Upon receiving the request, the user device 110 may generate the digital signature by encrypting the seed data using the private key associated with the digital wallet. The digital signature can be used as the verification data for verifying the ownership of the digital wallet, as only the owner of the digital wallet has possession of the private to generate the digital signature.

The user device 110 may then transmit the digital signature, as the verification data, to the transaction module 132 (in step three of the flow 300). The transaction module 132 may decrypt the digital signature using the public key associated with the digital wallet. If the decrypted data matches the seed data transmitted to the user device 110, the transaction module 132 may determine that the user 140 has possession of the private key and thus is likely the owner of the private key (i.e., has control over the digital wallet). However, using the synchronous method, the ownership verification process would require at least three separate communications between the transaction module 132 and the user device 110. For example, using this synchronous method, the user device 110 has to first transmit a request for performing a time-sensitive transaction using funds in the source currency to the transaction module 132. The transaction module 132 may then generate and send the seed data to the user device 110. The user device 110 may generate the digital signature based on the seed data, and transmit the digital signature to the transaction module 132 for verification. Due to the requirement for the two-way communications, using the synchronous method to verify ownership of the digital wallet can lead to an increased latency for processing the purchase transaction. Since the transaction that the user 140 wishes to perform is time-sensitive, the increased latency can be undesirable.

Instead of using the synchronous method, the transaction module 132 of some embodiments may use the asynchronous method to verify the ownership of the digital wallet. The asynchronous method does not require the transaction module 132 to generate any seed data and/or transmit the seed data to the user device 110 of the user 140, for the user device 110 to generate the verification data. Instead, the user device 110 may unilaterally generate the verification data for the digital wallet using the private key associated with the digital wallet. The verification data can be used by anyone obtaining the verification data to verify, using the public key associated with the digital wallet, that the person (e.g., the user 140) generating the verification data has possession of the corresponding private key associated with the digital wallet. As such, the asynchronous method eliminates the multiple two-way communications between the user device 110 and the transaction module 132, as required by the verification process using the synchronous method. Using the asynchronous method, the user device 110 may generate the verification data and send the verification data to the transaction module 132 in step three of the flow 300, without waiting for the transaction module 132 to determine and/or to send any seed data. In some embodiments, the user device 110 may merge step one and step three in the flow 300 such that the verification data can be transmitted along with the request to the transaction module 132, further reducing the communication between the user device 110 and the transaction module 132.

In some embodiments, the user device 110 may generate the verification data using the asynchronous method based on the private key associated with the digital wallet, a generator function that was used to generate the private key and/or the public key of the digital wallet, and a user-generated value determined by the user 140 and/or the user device 110. The user-generated value can be determined in different manners. For example, the user device 110 can determine the user-generated value for generating the verification data using a random value generator, a counter (that increments every time the user device 110 generates verification data for a transaction), a current time, etc. The goal is to use a different user-generated value for generating the verification data every time the user device 110 generates the verification data such that the verification data is different every time. In some embodiments, the verification data may be generated based on the Schnorr signature, and in the form of a triplet [V, r, c]. The value c in the triplet can be calculated using Equation (1) below:

$$c = H(x \cdot G \| G \| x) \quad (1)$$

where H is a hash function (e.g., an SHA256 cryptographic hash function, etc.), x is the private key associated with the digital wallet, and G is the generator function that generates the private key and/or the public key associated with the digital wallet.

The value V can be calculated using Equation (2) below:

$$V = v \cdot G \quad (2)$$

where v is the user-generated value (e.g., a random number, a current time, a counter, etc.).

The value r can be calculated using Equation (3) below:

$$r = v - c \cdot x \quad (3)$$

After calculating the verification data in the form of a triplet [V, r, c], the user device 110 may transmit the verification data to the transaction module 132. For example, the user device 110 may transmit the verification data along with the request to process the transaction to the transaction module 132 (e.g., by merging step one and step three together in the flow 300). As discussed herein, the verification data that is generated using the asynchronous method can be verified by anyone who has access to the public key associated with the digital wallet. Thus, upon receiving the verification data, the transaction module 132 may verify the ownership of the digital wallet based on the verification data in step four of the flow 300.

In order to verify that the verification data is generated based on the private key associated with the digital wallet (i.e., the user 140 who generated the verification data has possession of the private key associated with the digital wallet), the transaction module 132 may generate an output value based on the verification data and the public key associated with the digital wallet. For example, the output value may be generated using Equation (4) below:

$$V' = r \cdot G + c(x \cdot G) \quad (4)$$

where x·G is the public key associated with the digital wallet.

The Equations (1)-(4) are designed in such a way that V' would equal to V if and only if the private key used to calculate the triplet [V, r, c] corresponds to the public key based on the generator function G (e.g., the public key was generated by the generator function G based on the private key x). As such, the transaction module 132 may compare the output value V' against the value V, and may verify that the user 140 is the owner of the digital wallet when V' equals to V. Using the asynchronous method, the transaction module 132 may verify the ownership of a wallet (i.e., the possession of a private key), without any a priori knowledge of the data (e.g., the user-generated value v, etc.) that was used to generate the verification data.

In some embodiments, in order to prevent the user 140 from re-using the verification that has been generated (e.g., by the user device 110 or any other user devices for a past transaction) in this transaction, the transaction module 132 may require that the user-generated value v be different every time (such that the triplet has different values from any previously generated triplets for the same digital wallet). For example, the transaction module 132 may require the user device 110 to determine the user-generated value based on a current date/time or a counter that automatically increments every time a triplet is generated by the user device 110. The transaction module 132 may store all of the triplets provided to the transaction module 132 from different users in association with past purchase transactions. Upon receiving the triplet from the user device 110 in connection with the request, the transaction module 132 may compare the triplet against other triplet(s) stored by the transaction module 132 in connection with the digital wallet. If the triplet matches (e.g., has identical values) any of the stored triplet(s), the transaction module 132 may determine that the user device 110 may have re-used previously generated verification data and may deny the request for processing the purchase transaction.

Returning to FIG. 3, after verifying that the user 140 of the user device 110 is the owner of (e.g., has control over) the digital wallet, the transaction module 132 may process the transaction on behalf of the user 140. It is noted that if the ownership of the digital wallet is not verified (e.g., when V' does not equal to V), the transaction module 132 may deny the request for processing the transaction for the user 140. However, if the ownership of the digital wallet is verified, the transaction module 132 may request the user device 110 to initiate a fund transfer from the first cryptocurrency account (e.g., the digital wallet) to a second cryptocurrency account associated with the service provider server 130. In step five of the flow 300, the user device 100 may communicate with the cryptocurrency network 180 to initiate the fund transfer transaction to transfer fund in the source currency from the digital wallet to a cryptocurrency account associated with the service provider server 130. In some embodiments, the transaction module 132 may obtain a confirmation of the fund transfer transaction from the cryptocurrency network 180 in step six of the flow 300.

As discussed herein, the fund transfer transaction may take a substantial amount of time to complete, due to the verification requirements associated with the source currency. As such, in order to process the transaction for the user 140 in a timely manner, the transaction module 132 may process the transaction using a credit extended to the user 140, in step seven of the flow 300. For example, the transaction module 132 may use funds in a target currency (e.g., a fiat currency, a different cryptocurrency from the source currency, etc.) to process the purchase transaction for the user 140 such that the transaction can be processed within the time constraint. If the user has multiple target currencies suitable for the purchase transaction (e.g., sufficient amount and within time constraints), the system may select the one or more target currencies based on various factors, including user preferences, exchange rates, etc. Since the service provider server 130 has not received the funds from the user 140 yet (the fund transfer transaction has been initiated but has not yet been completed at this point), the purchase transaction is processed based on a credit extended to the user 140. For example, the transaction module 132 may communicate with the merchant server 120 and may process the purchase transaction with the merchant server 120, on behalf of the user 140, using the funds in the account associated with the service provider server 130. In some embodiments, when the funds in the source currency is intended to fund only a portion of the purchase transaction, the transaction module 132 may combine the credit extended to the user with another fund associated with the user to process the purchase transaction.

While extending a credit for any user comes with a risk (e.g., a risk of the user not paying back), the risk is greatly reduced based on the verification of the ownership of the digital wallet of the user 140, and the confirmation that the transaction module 132 received related to the initiation of the fund transfer transaction. When the transaction with the merchant server 120 is completed, the transaction module 132 may transmit to the user device 110 that the purchase has been processed, in step eight of the flow 300.

In some embodiments, the transaction module 132 may process the purchase for the user 140 using the credit (in step seven) before receiving the confirmation that the fund transfer transaction has been initiated to further reduce the time for processing the purchase transaction. In some embodiments, the transaction module 132 may determine whether to perform step seven of the flow (e.g., processing the purchase transaction using the credit) before or after receiving a confirmation of the fund transfer transaction based on a risk determined for the user 140. The risk can be determined based on different factors, such as a balance of the digital wallet (e.g., if the balance exceeds twice the amount required to perform the transaction, process the transaction before receiving the confirmation, etc.).

While the example illustrated above is associated with processing a purchase transaction for a user, the techniques to verify ownership of a cryptocurrency account can be used in other applications. For example, in an online auction setting, anyone who is submitting a bid based on a cryptocurrency may be required to submit verification data, generated using the synchronous or asynchronous methods as disclosed herein, along with the bid, such that the organizer of the auction can verify the balance and ownership of a cryptocurrency account used for submitting the bid in real-time. In some embodiments, the ownership verification process can be used in any transaction (e.g., admission to a particular venue, admission to an organization, etc.) that involve a cryptocurrency to verify an ownership of a cryptocurrency wallet.

Figure 4:
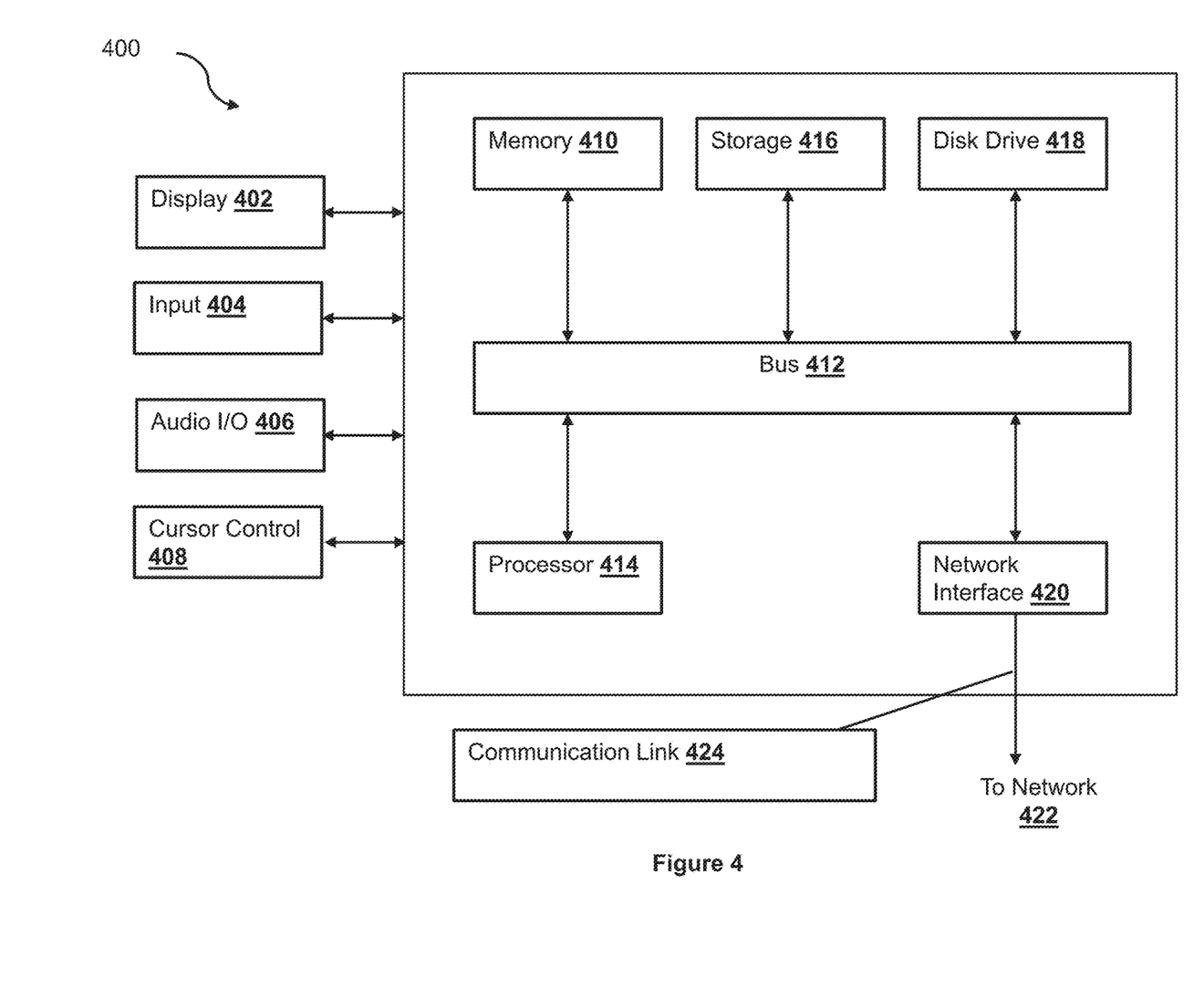
FIG. 4 is a block diagram of a system for implementing a device according to an embodiment of the present disclosure.

FIG. 4 is a block diagram of a computer system 400 suitable for implementing one or more embodiments of the present disclosure, including the service provider server 130, the merchant server 120, and the user devices 110. In various implementations, the user device 110 may include a mobile cellular phone, personal computer (PC), laptop, wearable computing device, etc. adapted for wireless communication, and each of the service provider server 130 and the merchant server 120 may include a network computing device, such as a server. Thus, it should be appreciated that the devices/servers 110, 120, and 130 may be implemented as the computer system 400 in a manner as follows.

The computer system 400 includes a bus 412 or other communication mechanism for communicating information data, signals, and information between various components of the computer system 400. The components include an input/output (I/O) component 404 that processes a user (i.e., sender, recipient, service provider) action, such as selecting keys from a keypad/keyboard, selecting one or more buttons or links, etc., and sends a corresponding signal to the bus 412. The I/O component 404 may also include an output component, such as a display 402 and a cursor control 408 (such as a keyboard, keypad, mouse, etc.). The display 402 may be configured to present a login page for logging into a user account or a checkout page for purchasing an item from a merchant. An optional audio input/output component 406 may also be included to allow a user to use voice for inputting information by converting audio signals. The audio I/O component 406 may allow the user to hear audio. A transceiver or network interface 420 transmits and receives signals between the computer system 400 and other devices, such as another user device, a merchant server, or a service provider server via a network 422, such as network 160 of FIG. 1. In one embodiment, the transmission is wireless, although other transmission mediums and methods may also be suitable. A processor 414, which can be a micro-controller, digital signal processor (DSP), or other processing component, processes these various signals, such as for display on the computer system 400 or transmission to other devices via a communication link 424. The processor 414 may also control transmission of information, such as cookies or IP addresses, to other devices.

The components of the computer system 400 also include a system memory component 410 (e.g., RAM), a static storage component 416 (e.g., ROM), and/or a disk drive 418 (e.g., a solid-state drive, a hard drive). The computer system 400 performs specific operations by the processor 414 and other components by executing one or more sequences of instructions contained in the system memory component 410. For example, the processor 414 can perform the electronic transaction functionalities described herein according to the flows 200 and 300.

Logic may be encoded in a computer readable medium, which may refer to any medium that participates in providing instructions to the processor 414 for execution. Such a medium may take many forms, including but not limited to, non-volatile media, volatile media, and transmission media. In various implementations, non-volatile media includes optical or magnetic disks, volatile media includes dynamic memory, such as the system memory component 410, and transmission media includes coaxial cables, copper wire, and fiber optics, including wires that comprise the bus 412. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 400. In various other embodiments of the present disclosure, a plurality of computer systems 400 coupled by the communication link 424 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system, comprising:

a non-transitory memory; and one or more hardware processors coupled with the non-transitory memory and configured to read instructions from the non-transitory memory to cause the system to perform operations comprising:

receiving, from a user device of a user, a transaction request for conducting an electronic transaction using a first digital wallet of the user, wherein the transaction request specifies a time constraint for completing the electronic transaction;

determining that the electronic transaction using the first digital wallet cannot be completed within the time constraint based on a number of blockchain transactions required for the electronic transaction;

detecting a network bandwidth condition between the system and the user device;

in response to determining that the network bandwidth condition is below a threshold, performing an asynchronous verification process, wherein the performing the asynchronous verification process comprises, without transmitting seed data for generating a digital signature to the user device, obtaining verification data from the user device, wherein the verification data is usable to verify an ownership of the first digital wallet, and wherein the verification data is calculated based on a private key associated with the first digital wallet, a generator function used to generate the private key, and a variable corresponding to at least one of a time or a counter;

calculating an output based on a public key associated with the first digital wallet, the generator function, and a first portion of the verification data;

verifying the ownership of the first digital wallet based on comparing the output against a second portion of the verification data;

in response to verifying the ownership of the first digital wallet, initiating a blockchain transaction, from the number of blockchain transactions, that transfers funds from the first digital wallet to a second digital wallet controlled or accessible by the system; and without waiting for the blockchain transaction to complete, processing the transaction request within the time constraint.

2. The system of claim 1, wherein the funds from the first digital wallet are associated with a first cryptocurrency, and wherein the transaction request is processed using a second cryptocurrency different from the first cryptocurrency.

3. The system of claim 1, wherein the transaction request is processed using a fiat currency.

4. The system of claim 1, wherein the operations further comprise:
transmitting, to the user device, a request to transfer the funds from the first digital wallet to the second digital wallet.

5. The system of claim 4, wherein the initiating the blockchain transaction is performed further in response to receiving a confirmation of the request from the user device.

6. The system of claim 1, wherein the processing the transaction request is performed before the initiating the blockchain transaction.

7. The system of claim 1, wherein the verification data comprises a first value calculated based on the private key associated with the first digital wallet and a second value calculated based on one or more parameters associated with the generator function.

8. A method, comprising:
receiving, by one or more hardware processors from a user device of a user, a request for performing an electronic transaction using first funds from a first digital wallet of the user, wherein the request specifies a time constraint for completing the electronic transaction;
determining that a time duration for completing the electronic transaction using the first funds from the first digital wallet is longer than the time constraint;
detecting, by the one or more hardware processors, a network bandwidth associated with a blockchain network;
performing, by the one or more hardware processors, an asynchronous verification process for verifying an ownership of the first digital wallet based on the network bandwidth, wherein the performing the asynchronous verification process comprises (i) obtaining verification data from the user device, wherein the verification data is usable to verify the ownership of the first digital wallet, and wherein the verification data is calculated based on a private key associated with the first digital wallet, a function used to generate the private key, and an input value corresponding to a time or a counter, (ii) calculating an output based on a public key associated with the first digital wallet, the function, and a first portion of the verification data, and (iii) verifying the ownership of the first digital wallet based on comparing the output against a second portion of the verification data;
in response to verifying the ownership of the first digital wallet, initiating a blockchain transaction that transfers the first funds from the first digital wallet to a second digital wallet; and
without requiring a completion of the blockchain transaction, processing, by the one or more hardware processors, the electronic transaction for the user using second funds different from the first funds.

9. The method of claim 8, wherein the verification data comprises a first verification value that is calculated based on the private key, a second verification value that is calculated based on the function, and a third verification value that is calculated based on the input value.

10. The method of claim 8, wherein the verification data comprises a triplet including a first verification value, a second verification value, and a third verification value, wherein the calculating the output is further based on the first verification value and the second verification value, and wherein the verifying comprises:
comparing the output against the third verification value of the verification data.

11. The method of claim 10, wherein the ownership of the first digital wallet is verified when the output value equals the first verification value.

12. The method of claim 8, further comprising:
obtaining a confirmation that the blockchain transaction has been initiated.

13. The method of claim 12, wherein the processing the electronic transaction is further responsive to the obtaining the confirmation.

14. The method of claim 12, wherein the processing the electronic transaction is performed prior to the obtaining the confirmation.

15. A non-transitory machine-readable medium having stored thereon machine-readable instructions executable to cause a machine to perform operations comprising:
receiving, from a user device of a user, a transaction request for conducting an electronic transaction using a first digital wallet of the user, wherein the transaction request specifies a time constraint;
determining that the electronic transaction using the first digital wallet cannot be completed within the time constraint based on a number of blockchain transactions required for the electronic transaction;
detecting a network bandwidth condition between the machine and the user device;
performing an asynchronous verification process for verifying an ownership of the first digital wallet based on the network bandwidth condition, wherein the performing the asynchronous verification process comprises obtaining verification data from the user device, wherein the verification data is usable to verify the ownership of the first cryptocurrency wallet, and wherein the verification data is calculated based on a private key associated with the first cryptocurrency wallet, a function used to generate the private key, and a variable corresponding to at least one of a time or a counter;
calculating an output based on a public key associated with the first digital wallet, the function, and a first portion of the verification data;
verifying the ownership of the first digital wallet based on comparing the output against a second portion of the verification data;
in response to verifying the ownership of the first digital wallet, initiating a blockchain transaction that transfers funds from the first digital wallet to a second digital wallet; and
independent of a completion of the blockchain transaction, processing the transaction request.

16. The non-transitory machine-readable medium of claim 15, wherein the funds are associated with a first type of cryptocurrency, and wherein the transaction request is processed using a second type of cryptocurrency different from the first type of cryptocurrency.

17. The non-transitory machine-readable medium of claim 16, wherein the transaction request is processed within the time constraint.

18. The non-transitory machine-readable medium of claim 15, wherein the operations further comprise verifying, via accessing a cryptocurrency network, that a balance associated with the first digital wallet is larger than an amount associated with the transaction request.

19. The non-transitory machine-readable medium of claim 15, wherein the verification data comprises a first verification value, a second verification value, and a third verification value, wherein the output is calculated based on the first verification value and the second verification value, and wherein the verifying the ownership of the first digital wallet comprises:
   comparing the output value against the third verification value.

20. The non-transitory machine-readable medium of claim 19, wherein the verification data comprises a triplet, and wherein the ownership of the first digital wallet is verified when the output value corresponds to one of the triplet in the verification data.

* * * * *